April 26, 1955
J. H. HUTCHINGS
2,707,245
AIR-COOLED GASEOUS-DISCHARGE TUBE
Filed May 18, 1953
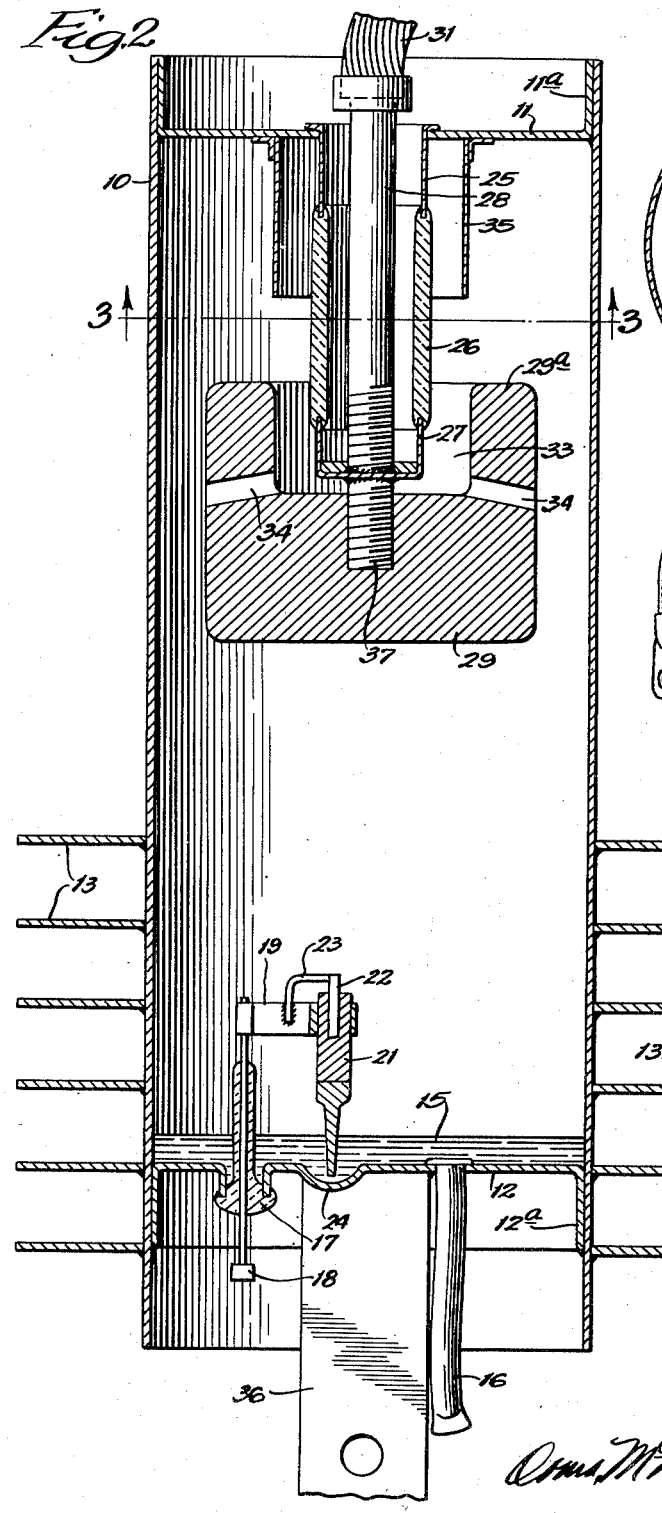
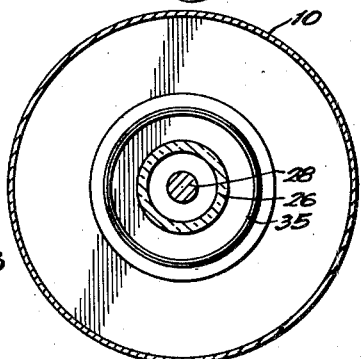
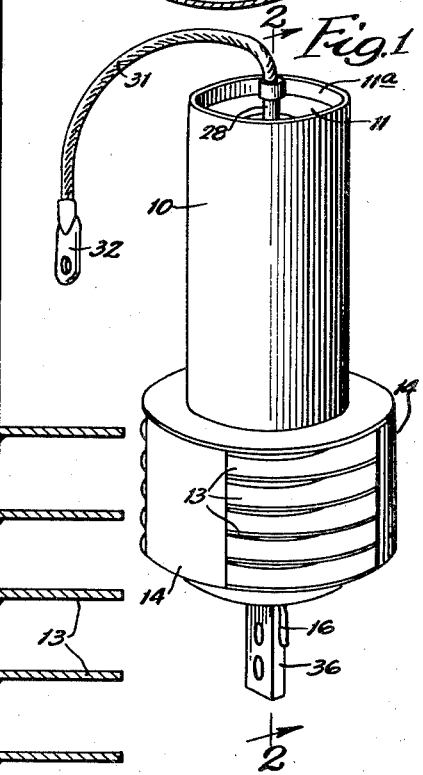
INVENTOR:
John H. Hutchings,
BY
Oms McDougall, William & Hersh,
ATTORNEYS.

United States Patent Office 2,707,245
Patented Apr. 26, 1955

2,707,245

AIR-COOLED GASEOUS-DISCHARGE TUBE

John H. Hutchings, Geneva, Ill., assignor to National Electronics, Inc., Geneva, Ill., a corporation of Illinois Application May 18, 1953, Serial No. 355,730

5 Claims. (Cl. 313—43)

This invention relates to air-cooled gaseous discharge tubes, and is particularly applicable to that class of discharge tubes employing, as a discharge medium, the vapor of a normally liquid material such as mercury.

Extensive use has been made in industry of the conducting properties of ionized gases, particularly mercury vapor. Mercury vapor tubes of various types are employed as rectifiers, as circuit interrupters, and in numerous other applications. In many of those applications wherein currents of large magnitude are being dealt with, tube cooling is an important design consideration. Air cooling, where feasible, is usually most economical. Air cooling, however, of gaseous-discharge tubes has in general been confined to tubes of relatively small size, since serious problems have arisen whenever air cooling of larger tubes has been attempted.

One problem particularly troublesome in the air cooling of mercury-vapor discharge tubes and the like has been the problem of avoiding arc-over upon resumption of operation after a brief period of inactivity. The present invention provides a tube which has proved to be singularly free from such arc-overs.

Gaseous-discharge tubes of the larger sizes are nearly always constructed with a metallic housing. This type of construction greatly facilitates cooling and adds to the mechanical ruggedness of the tube. All such tubes having metal housings, however, must of necessity contain a glass seal which permits maintenance within the tube of a low gas pressure while providing a means for making an external connection to one of the tube's electrodes, normally the anode.

An oft-encountered difficulty with such tubes, in addition to the one discussed in the previous paragraphs, is that of arc-back and fracture of the glass seal due to accumulation of static charges on the tube at the precise point of junction between the glass and metal which is at anode potential. When such accumulation of static charges has been allowed to occur, sudden interruption of current flow through the tube and application of negative voltage to the anode has often led to arcing across the glass seal and fracture thereof, particularly when the circuit is highly inductive.

The aforementioned problem of arc-over upon resumption of operation following a period of inactivity also involves the glass-to-metal seal. In prior-art tubes in which an effort was made to employ air cooling, the seal, when the tube was turned off after use, would cool rapidly. As a result, the vapor within the tube, normally mercury vapor, would tend to condense on the surface of the glass seal, forming a thin conductive film thereon. Were the tube turned off for a long period, the film thus formed might eventually break and substantially all the condensed material within the tube would be drawn by gravity to the lowest portion thereof, far separated from the seal. Were the period of inactivity only a brief one, however, the thin conductive film would often remain on the glass seal at the time operation was resumed, with the result that initial application of voltage to the tube electrodes would lead to a violent flashover.

In light of the foregoing, a major object of the present invention is to provide, in a gaseous-discharge tube having a metal housing, a construction permitting the use of air cooling with virtually complete freedom from condensation of vapor on the glass seal. A further object of the present invention is to provide, in such a gaseous-discharge tube, a construction adapted to reduce to a negligible level the accumulation of static charges on the electrodes adjacent the glass-metal junctions of the seal. Other objects and advantages of my invention will appear from the detailed specification thereof which follows.

In the accompanying drawing, I have illustrated my invention by employing, as a typical embodiment thereof, a gaseous-discharge tube of the type commonly known as an "ignitron." Such tubes are mercury-pool tubes in which vaporization of the mercury and conduction through the tube is initiated by a voltage pulse applied to a so-called "ignitor" electrode. Ignitron tubes are extensively used as rectifiers and, particularly, as circuit interrupters and control devices in electric welding apparatus. Intermittent use is encountered in practically all applications of gaseous-discharge tubes, but it is particularly prevalent in welder-control applications. Consequently, the present invention is especially well adapted for such service. While, in the detailed specification which follows, I shall describe my invention with particular reference to an ignitron tube, it is to be understood that such description is merely by way of illustration. My invention can be employed with other types of discharge devices.

In the drawing, Figure 1 is a perspective view showing the general external appearance of an air-cooled ignitron embodying my invention. Fig. 2 is a sectional view of the tube of Fig. 1, bringing out the structural details thereof. Fig. 3 is a sectional view, in the horizontal plane, of the tube of Fig. 1, the section being taken along the line 3—3 of Fig. 2.

The ignitron tube shown in the drawing has a metal housing consisting in large part of a cylindrical metal casing member 10. Near the top and bottom respectively of casing member 10 metal end plates 11 and 12 are inserted and welded thereto. To insure the existence of a good gas-tight seal between end plates 11 and 12 and casing member 10, the end plates are provided with annular flanges 11a and 12a, which are preferably seam-welded to casing member 10 around the entire periphery of the end plates.

Spaced at convenient intervals and welded to the outside of casing member 10 is a plurality of cooling fins 13. If desired, these fins may be provided with one or more thermostat-mounting plates 14.

The lower portion of the housing formed by casing member 10 and its respective end plates is occupied by a pool of liquid mercury 15, which, in a typical case, may fill the tube to a depth of perhaps one-fourth to five-sixteenths inch. Suitably welded into apertures in bottom plate 12 I provide an evacuation tube 16 and a glass seal member 17 for supporting the ignitor electrode. Glass seal member 17 has passing through it a relatively rigid conductor 18, at the top of which, within the housing, is welded or otherwise secured a metallic transverse support member 19. The end of support 19 is crimped around a carbon electrode 21, which is generally pencil-shaped and which has a tip of boron carbide or other material of intermediate conductivity and which is long enough to extend downward into the mercury pool 15. To insure good electrical connection between electrode 21 and support member 19, I may provide a pin 22, threadedly received in the upper end of electrode 21 and secured to member 19 by a welded lead 23. The bottom plate 12 is provided, directly under electrode 21, with a slight depression or dimple 24, the function of which is to deepen the mercury pool at the particular point whereat the ignitor electrode enters it. In a typical case, the depth of the mercury pool at dimple 24 may be about three-eighths inch, and the ignitor electrode 21 may at that point extend into the mercury pool some five-sixteenths inch.

It will be understood by persons skilled in the art that the ignitor electrode just described is a conventional part of ignitron tubes and does not form a part of the present invention.

The top plate 11 is provided with a central aperture into which is welded a metal flange cylinder 25, which will preferably be formed of an alloy, such as Kovar, well adapted to being welded to glass. The flange at the upper end of cylinder 25 is preferably welded to top plate 11 by means of an annular seam weld, so as to insure gas-tightness. The bottom end of cylinder 25 is welded, by means of an annular seal, to the upper end of a glass cylinder 26. The lower end of glass cylinder 26 carries a similar annular glass-to-metal seal with a cup member 27, which is also preferably made of a suitable alloy such as Kovar.

Cup element 27 is welded to threaded bolts 28 and 37. Bolt 37 extends a substantial distance downward beyond cup 27 and bolt 28 extends upward to a point above the upper end of cylinder 25.

Anode element 29 is supported by the lower end of bolt 37, any suitable manner of assembly being employed. I prefer to place a threaded aperture in the top surface of anode 29, adapted to be screwed on the lower end of bolt 37.

The head of bolt 28 is recessed to receive a flexible lead 21, which may be welded to the head of bolt 28 and which may be provided at its free end with a suitable connector lug 32 adapted to make contact to an external circuit.

The anode 29 is a relatively massive block of graphite cut away on its top surface to provide a central recess 33, substantially greater in diameter than the tubular glass seal 26 and surrounded by a raised annular rim portion 29a. At spaced intervals around the anode 29, transverse, slightly inclined apertures 34 are provided, affording communication between the interior of the housing and the bottom of the recess 33. Apertures 34 increase substantially the surface area of the anode in proportion to its volume, which assists extraction of gas from the anode during evacuation of the tube, and, in addition, apertures 34 provide a gravity drainage means permitting escape of any liquid mercury which might find its way into recess 33.

Welded to the under side of top plate 11 is a cylindrical baffle member 35, of diameter substantially greater than that of tubular seal 26 and approximately equal to the diameter of recess 33 in anode 29. Baffle 35 is preferably disposed directly above the recess 33, with the result that baffle 35 and recess 33 collectively define a cylindrical space above the anode 29 which is wholly enclosed save for an annular gap immediately below the bottom rim of baffle 35.

A support member 36 is welded to bottom plate 12, to provide a convenient means of mounting the tube in a vertical position and providing also a convenient external circuit connection for the cathode.

*Operation*

In operation, my gaseous-discharge tube will normally be mounted in a vertical plane, supported by member 36, and some suitable forced-air means will be provided for cooling the tube, with the assistance of fins 13. The circuit to be controlled by the tube is connected to the external terminals 32 and 36; when the tube is being used for circuit-control purposes, especially in welding operations, two of the tubes may be connected "back to back." That is, a second tube may be connected with its cathode connected to the anode of the first tube and its anode connected to the cathode of the first tube. Such an arrangement will permit the passage of alternating current through the tubes whenever they are ignited by means of ignitor electrode 21. If only one tube be used, or a rectifier circuit arrangement, rectification as well as circuit control will take place, since a tube can pass current only in one direction.

When an arc is formed on the mercury pool 15 by the application of a suitable ignition potential to ignitor electrode 21, current will commence to flow through the tube by means of electron and ion conduction. In some applications, this current is very heavy, reaching peaks of as high as several thousand amperes. As a result, the tube will tend to become very hot. If operated at normal load, or intermittently, however, it will be adequately cooled by the forced air passing by the fins 13.

When, after a period of operation, the tube is temporarily turned off, the casing will cool rapidly, under the influence of the air passing by the fins. The anode, however, will cool much less rapidly, since it is suspended in what is virtually a high vacuum and is not directly cooled by the circulating air. As a result, the space above the anode, particularly that space within the zone defined by baffle 35 and recess 33, will remain warmer than the portion of the tube adjacent the outer casing 10. Thus, any uncondensed mercury vapor within the tube interior will condense on the inner walls of casing 10 or elsewhere within the tube and will not condense on the glass seal 26.

In addition to providing a heated zone for protection of seal 26, the recess 33 and the baffle 35 define a long, round-about path for ions to strike the junction zones between glass and metal at the respective ends of the seal 26, and consequently reduce virtually to nothing the number of ions striking those zones. This prevents accumulation of static charges on the junction zones and eliminates flashovers caused thereby. The lower junction, adjacent the anode, is the more important one.

While I have in the present specification described in considerable detail a particular embodiment of my invention, it is to be understood that my description has been for purposes of illustration only, and that the scope of my invention is to be determined primarily by reference to the appended claims.

I claim:

1. In a gaseous-discharge tube characterized by an anode and a metal housing having a sealed aperture therein for permitting external electrical connection to said anode, the improvement comprising, in combination, an anode provided with a raised rim around its top surface defining a partially enclosed zone above said anode, a metal terminal element joined to said anode on its top side within said partially enclosed zone, and a generally cylindrical glass sheath surrounding said terminal element, said sheath being joined to said terminal element by an annular glass-to-metal weld within said zone below said upper edge of said rim, said glass sheath having also an annular glass-to-metal weld to said housing, filling and sealing off said aperture.

2. In a gaseous-discharge tube characterized by an anode and a metal housing having a sealed aperture therein for permitting external electrical connection to said anode, the improvement comprising, in combination, an anode provided with a raised rim around its top surface defining a partially enclosed zone above said anode, a metal terminal element joined to said anode on its top side within said partially enclosed zone, and a cylindrical glass tube surrounding said terminal element, the lower edge of said tube being joined to said terminal element by an annular glass-to-metal weld within said partially enclosed zone, the other end of said glass tube being joined by an annular glass-to-metal weld to said housing, said tube thereby filling and sealing off said aperture.

3. Apparatus according to claim 1 wherein the whole of said glass sheath is disposed within the generally cylindrical contour of said housing.

4. In a gaseous-discharge tube characterized by an anode and a metal housing having a sealed aperture therein for permitting external electrical connection to said anode, the improvement comprising, in combination, an anode, a heat-shield baffle mounted in the housing around said aperture, said baffle and said anode defining a partially enclosed zone above said anode, a metal terminal element joined to said anode on its top side within said partially enclosed zone, and a glass sheath surrounding said terminal element, said sheath being joined to said terminal element by an annular glass-to-metal weld within said zone, said glass sheath having also an annular glass-to-metal weld to said housing, filling and sealing off said aperture.

5. In a gaseous-discharge tube characterized by an anode and a metal housing having a sealed aperture therein for permitting external electrical connection to said anode, the improvement comprising, in combination, an anode provided with a raised rim around its top surface defining a partially enclosed zone above said anode, a heat-shield baffle mounted in said housing around said aperture, defining a generally cylindrical space above and slightly separated from said zone defined by said raised rim, and a glass tube surrounding said terminal element, the lower end of said tube being joined to said terminal element by an annular glass-to-metal weld within said zone below said upper edge of said rim, the upper end of said glass tube being joined to said housing by an annular glass-to-metal weld filling and sealing off said aperture, said last-mentioned weld being within said space defined by said baffle.

References Cited in the file of this patent

UNITED STATES PATENTS

| | | |
|---|---|---|
| 2,130,888 | Marshall | Sept. 20, 1938 |
| 2,144,496 | Klemperer | Jan. 17, 1939 |
| 2,367,966 | Schmidt | Jan. 23, 1945 |
| 2,433,181 | White | Dec. 23, 1947 |